United States Patent
Park et al.

(10) Patent No.: US 7,114,382 B2
(45) Date of Patent: Oct. 3, 2006

(54) SYSTEM FOR MEASURING PRESSURE AND/OR TEMPERATURE OF A TIRE

(75) Inventors: Jin Ho Park, Seoul (KR); Jin Wook Burm, Goyang (KR)

(73) Assignee: Hyundai Motor Company and Kia Motors Corporation, Seoul (KR)

( * ) Notice: Subject to any disclaimer, the term of this patent is extended or adjusted under 35 U.S.C. 154(b) by 56 days.

(21) Appl. No.: 11/001,591

(22) Filed: Dec. 1, 2004

(65) Prior Publication Data

US 2005/0138998 A1    Jun. 30, 2005

(30) Foreign Application Priority Data

Dec. 30, 2003    (KR) .................... 10-2003-0100758

(51) Int. Cl.
*E01C 23/00*    (2006.01)
*B60C 23/02*    (2006.01)

(52) U.S. Cl. ....................................................... 73/146
(58) Field of Classification Search .................. 73/801, 73/146
See application file for complete search history.

(56) References Cited

U.S. PATENT DOCUMENTS

| | | | | |
|---|---|---|---|---|
| 4,542,356 A | * | 9/1985 | Nakazawa et al. | 333/195 |
| 4,661,738 A | * | 4/1987 | Skeie | 310/313 D |
| 6,373,167 B1 | * | 4/2002 | Yoshimoto et al. | 310/313 D |
| 6,496,086 B1 | * | 12/2002 | Tsuzuki et al. | 333/195 |
| 6,967,545 B1 | * | 11/2005 | Abramov | 333/193 |
| 2002/0121132 A1 | * | 9/2002 | Breed et al. | 73/146 |
| 2002/0140598 A1 | * | 10/2002 | Stierlin et al. | 342/51 |
| 2002/0163402 A1 | * | 11/2002 | Tsuzuki et al. | 333/195 |

FOREIGN PATENT DOCUMENTS

WO    WO 99/61265    12/1999

* cited by examiner

*Primary Examiner*—Max Noori
(74) *Attorney, Agent, or Firm*—Morgan Lewis & Bockius LLP

(57) ABSTRACT

In a system for measuring pressure and/or temperature of a tire, reflectivity of reflectors is significantly enhanced and manufacture is significantly easier, since the system is provided with a board, an antenna provided to the board in order to send/receive a micro-wave to/from an external device, an IDT (inter-digital transducer) provided to the board and transducing the micro-wave into SAW (Surface Acoustic Wave), a waveguide part forming at least one looped channel of a polygonal shape on the board, the polygonal shape comprising a corner located at the IDT, and a plurality of reflectors provided to the at least one looped channel at corners different from the corner located at the IDT.

11 Claims, 1 Drawing Sheet

SYSTEM FOR MEASURING PRESSURE AND/OR TEMPERATURE OF A TIRE

CROSS-REFERENCE TO RELATED APPLICATIONS

This application claims priority of Korean Application No. 10-2003-0100758, filed Dec. 30, 2003, the disclosure of which is incorporated herein by reference.

FIELD OF THE INVENTION

The present invention relates to a system for measuring pressure and/or temperature of a tire, and more particularly, to a system for measuring pressure and/or temperature of a tire using a SAW (Surface Acoustic Wave) sensor.

BACKGROUND OF THE INVENTION

Generally, there are several kinds of systems for measuring pressure and/or temperature of a tire. Among them, a system using a SAW sensor measures pressure and/or temperature of a tire and sends information on the measured pressure and/or temperature through wireless communication. The system using a SAW sensor has an advantage that a SAW sensor does not need an inner power supply.

A typical system for measuring pressure and/or temperature of a tire using a SAW sensor includes an antenna and a SAW sensor. The antenna receives micro-waves from an external device and sends information on pressure and/or temperature of the tire back to the external device. The SAW sensor generally includes a transducer and a plurality of reflectors, typically three, arranged in a straight line. The transducer receives micro-waves from the antenna and converts them into a SAW (Surface Acoustic Wave). The converted SAW travels via the reflectors and finally returns to the transducer. The returned SAW is converted back to micro-waves, and the converted micro-waves are transmitted to an external device through the antenna.

Tire temperature can be measured because the travel speed of the SAW varies according to the temperature of surrounding air. In addition, if an impedance is connected to one of the reflectors, the quantity of the reflected SAWs is changed in response to the impedance. Therefore, by connecting a capacitive sensor with impedance that varies according to pressure to a second reflector, the quantity of SAWs reflected will be varied. The pressure can thus be determined by comparing the quantity of SAWs reflected as between different reflectors.

However, there are certain disadvantages to such systems. A reflected SAW is transmitted through all reflectors sequentially due to the straight line arrangement, and therefore must pass the first and last reflector twice. Thus, the transmissivity of the reflectors must be greater than reflectivity thereof in order for the SAW transmitting through a first reflector to return to the first reflector via a last reflector. Therefore, reflectivity of each of the reflectors must be designed to be less than transmissivity thereof.

Such a system has a problem in that a micro-wave output from the transducer becomes smaller than a micro-wave input thereto. In addition, since the system uses wireless communication in order for the saw sensor to communicate with an external device, the system generally uses a higher frequency than frequencies typically used for a hard-wired communications.

Under such high-frequencies, a problem can occur in that the gap between electrodes of the transducer and reflectors becomes smaller. As an example, in order to produce a tranducer with a frequency of 430 MHz using a board made of LiNbO3 (LN; Lithium Niobate), the gap between electrodes of the transducer must be about 2 μm. Accordingly, in order to produce an transducer having frequencies higher than 430 MHz, the gap between electrodes must be further decreased, so that it becomes difficult to manufacture the transducer. In addition, the magnitude of electric field increases, so that accuracy and reliability of the transducer and reflectors deteriorates.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a system for measuring a pressure and/or temperature of a tire, having non-limiting advantages of enhanced reflectivity and ease of manufacture.

An exemplary system for measuring pressure and/or temperature of a tire according to an embodiment of the present invention includes a board; an antenna provided to the board in order to send/receive a micro-wave to/from an external device; an IDT (inter-digital transducer) provided to the board and transducing the micro-wave into a SAW (Surface Acoustic Wave); a waveguide part forming at least one looped channel of a polygonal shape on the board, the polygonal shape comprising a corner located at the IDT; and a plurality of reflectors provided to the at least one looped channel at corners different from the corner located at the IDT.

In addition, it is preferable that the waveguide part is formed of a material for absorbing the SAW such that the SAW is not seceded from the looped channel.

In addition, it is also preferable that the at least one looped channel comprises a first looped channel comprising a corner located at the IDT; and a second looped channel comprising a corner located at the IDT, wherein the first looped channel and the second looped channel are respectively located at a left side and a right side of the IDT.

In addition, the system further includes a pressure sensor provided to any one of the first and the second looped channel. In addition, the pressure sensor may be connected to at least one of the plurality of reflectors. The first looped channel and the second looped channel may have different lengths from each other. As another example, the first looped channel and the second looped channel may be symmetrically located with respect to the inter-digital transducer. Also, the at least one looped channel may be formed in a rectangular shape, and the plurality of reflectors may be tilted at 45° with respect to a side of the looped channel. The pressure sensor also may be connected to a reflector positioned to a diagonal direction of the IDT.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
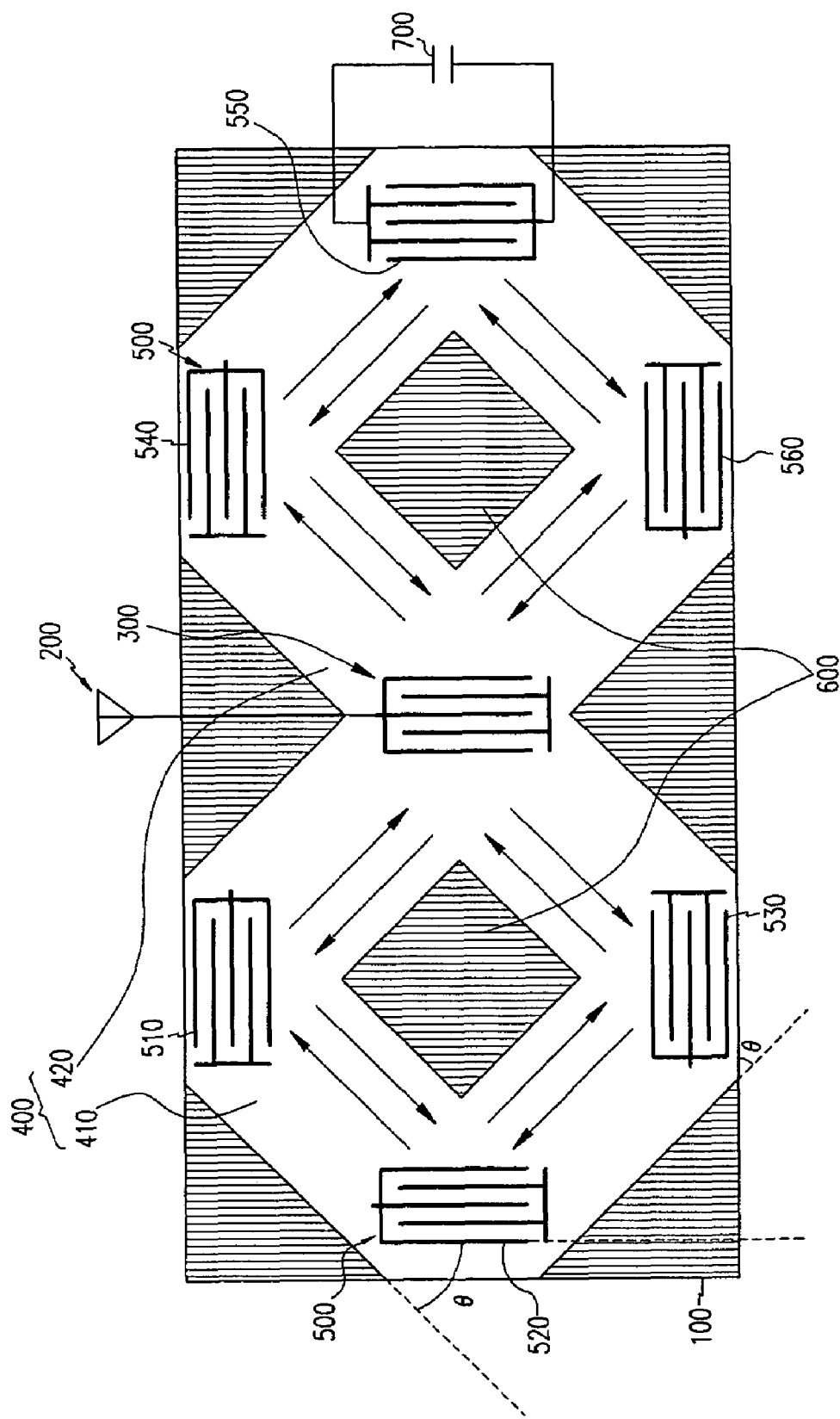
FIG. 1 is a schematic view of a system for measuring pressure and/or temperature of a tire according to an embodiment of the present invention.

An embodiment of the present invention will hereinafter be described in detail with reference to the accompanying drawings.

As shown in FIG. 1, a system for measuring pressure and/or temperature of a tire according to an embodiment of the present invention includes a board 100; an antenna 200 provided to the board 100 in order to send/receive a micro-wave to/from an external device (not shown); an IDT (inter-digital transducer) 300 provided to the board 100 and transducing the micro-wave into a SAW (Surface Acoustic Wave); a waveguide part 600 forming at least one looped channel 400 of a polygonal shape on the board, the polygonal shape comprising a corner located at the IDT 300; and a plurality of reflectors 500 provided to the at least one looped channel 400 at corners different from the corner located at the IDT 300.

The waveguide part 600 is to guide the SAW, and the reflectors 500 are to reflect the guided SAW. The waveguide part 600 is formed of a material for absorbing the SAW such that the SAW substantially does not escape from the looped channel. 400. As an example, the waveguide part 600 formed of the material interferes with a phenomenon that the SAW moves toward a diagonal direction of the looped channel 400.

The at least one looped channel 400 includes a first looped channel 410 having a corner located at one side (as an example, a left side of FIG. 1) of the IDT 300, and a second looped channel 420 having a corner located at another side (as an example, a right side of FIG. 1) of the IDT 300. It is preferable, but not necessarily required, that the first looped channel 410 and the second looped channel 420 are symmetrically located with respect to the IDT 300, such that the first and second looped channels 410 and 420 are more broadly positioned in the surrounding air.

The system also includes a pressure sensor 700 provided to any one of the first and the second looped channel 410 and 420 to measure a pressure of a tire according to a variation in impedance. The pressure sensor 700 may be connected to at least one of the plurality of reflectors 500 provided to the second looped channel 420. It is preferable that the pressure sensor 700 be connected at a fifth reflector 550 positioned at a diagonal direction with respect to the IDT 300 to reduce interference with the IDT 300 and the antenna 200.

The first looped channel 410 and the second looped channel 420 may have different lengths from each other, such that a temperature of a tire is more precisely measured. Moreover, the first looped channel 410 may be formed in a rectangular shape, and the plurality of reflectors comprise first, second, and third reflectors 510, 520, and 530 tilted at 45° with respect to a side of the first looped channel 410. Similarly, the second looped channel 420 may be formed in a rectangular shape, and the plurality of reflectors comprise fourth, fifth, and sixth reflectors 540, 550, and 560 tilted at 45° with respect to a side of the second looped channel 420.

An operation of a system according to an embodiment of the present invention will hereinafter be described in detail.

Firstly, to measure a temperature and/or pressure of a tire, an antenna 200 receives a micro-wave from an external device (not shown) and sends a micro-wave to an IDT 300.

The IDT 300 converts the micro-wave into a SAW.

The converted SAW travels clockwise or counterclockwise along a first and a second looped channel 410 and 420.

That is, the SAW travels sequentially via the first, the second, and the third reflector 510, 520, and 530 along the first looped channel 410, or travels sequentially via the third, the second, and the first reflector 530, 520, and 510 along the first looped channel 410. In addition, the SAW travels sequentially via the fourth, the fifth, and the sixth reflector 540, 550, and 560 along the second looped channel 420, or travels via the sixth, the fifth, and the fourth reflector 560, 550, and 540 along the second looped channel 420.

During the traveling time, the SAW is sequentially reflected by each of the reflectors 500.

The SAW having traveled one cycle along the first and the second looped channel 410 and 420 reaches the IDT 300, and is converted into a micro-wave therethrough.

Finally, the micro-wave is outputted through an antenna 200 and is transmitted to the external device.

Based on the operation, a pressure of a tire will be measured as follows.

As an example, since a capacitive sensor 700 with an impedance varying according to a pressure is connected to a fifth reflector 550 provided to a second looped channel 420, a quantity of SAWs reflected by the fifth reflector 550 is varied according to the pressure.

The pressure of the tire can be known by comparing the quantity of the SAWs reflected by the fifth reflector 550 to a quantity of SAWs reflected by a fourth and a sixth reflectors 540 and 560. Particularly, since the capacitive sensor 700 is not connected to the fourth and the sixth reflector 540 and 560, the quantity of the SAWs reflected by the fourth and the sixth reflectors 540 and 560 is a standard quantity.

As another example, Since a capacitive sensor 700 with an impedance varying according to a pressure is connected to a fifth reflector 550 provided to a second looped channel 420, a quantity of SAWs reflected by the fifth reflector 550 is varied according to the pressure. Consequently, a micro-wave converted through the IDT 300 is varied according to the pressure.

A pressure of the tire can be known by comparing a size of a micro-wave outputted through the first looped channel 410 to a size of a micro-wave outputted through the second looped channel 420. Particularly, since the capacitive sensor 700 is not connected to the reflectors 500 of the first looped channel 410, a size of a micro-wave outputted through the first looped channel 410 is a standard size.

Based on the operation, a temperature of a tire will be measured as follows.

The travel speed of the SAW varies according to the temperature of surrounding air, so that time consumed for the SAW to return to the IDT 300 also varies according to the temperature of the surrounding air. Based on the variation of the consumed time, the temperature of a tire can be detected. That is, the temperature of the tire can be known by comparing the consumed time to an original time.

Moreover, since the first and second looped channels 410 and 420 preferably have different lengths, the first time consumed for a micro-wave to output via the first looped channel 410 and the second time consumed for a micro-wave to output via the second looped channel 420 are different from each other. Accordingly, the temperature of a tire can be more precisely known by comparing the first consumed time to the second consumed time.

On the other hand, a SAW traveling clockwise and counterclockwise along the first and the second looped channel 410 and 420 may circle for more than one cycle. However, since the SAW dwindles during traveling, it is almost impossible for the SAW to circle for more than one cycle. Moreover, the possibility that the SAW will circle for more than one cycle will clearly be excluded by controlling a period of the micro-wave transmitted to an antenna 200.

On the other hand, since a system according to an embodiment of the present invention has at least one looped channel 400 and reflectors 500 each provided to corners thereof, the reflectors 500 do not require transmissivity. Therefore, a system according to an embodiment of the present invention can use reflectors 500 having a more reflectivity than the prior reflectors.

That is, since the reflectors 500 provided to a system according to an embodiment of the present invention can reflect a SAW of a higher quantity than prior reflectors (see reference number 30 of FIG. 1), a size of a micro-wave inputted to an antenna 200 from an external device (not shown) and a size of a micro-wave outputted to an external device (not shown) from an antenna 200 will be almost the same.

On the other hand, an IDT 300 and reflectors 500 respond only at a characteristic frequency, and in general, the characteristic frequency is inversely proportional to a distance between electrodes of the IDT 300 and reflectors 500. Accordingly, for using a high-frequency, the distance between electrodes of the IDT 300 and reflectors 500 must be designed smaller.

However, with an IDT 300 and reflectors 500 according to an embodiment of the present invention, a wide distance between electrodes thereof may correspond to a higher characteristic frequency. The reason is as follows.

According to a system of an embodiment of the present invention, a SAW enters at 45° to the reflectors 500 and reflects at 45° therefrom. Therefore, the distance between the electrodes correspondent to the same characteristic frequency may be raised to as much as 1/cos 45° times that of one used in the prior art.

This will be easily confirmed by a Bragg formula. That is, if a distance between electrodes is denoted as "d", a wavelength of a SAW as "$\lambda$", and an incident angle of a SAW as "$\theta$", the Bragg formula is defined as "$d \cos \Theta = n\lambda$" for natural numbers "n".

Therefore, in the case that the SAW is incident to the electrodes at an angle $\theta$, the distance d correspondent to the same value of $n\lambda$ may be as much as 1/cos $\theta$ times that of the case that the SAW is vertically incident.

As has been explained, the system for measuring a pressure and/or temperature of tire according to embodiments of the present invention has the following advantages.

According to embodiments of the present invention, because the system has at least one looped channel of a polygonal shape and reflectors each provided to corners thereof in order to use reflectors having a higher reflectivity than the prior reflectors, a size of a inputted micro-wave and a size of an outputted micro-wave can be almost the same.

In addition, According to embodiments of the present invention, because a SAW enters at $\theta$ (0°<$\theta$<90°) to the reflectors and is reflected at $\theta$ (0°<$\theta$<90°) therefrom, the distance between the electrodes correspondent to the same characteristic frequency can be raised by as much as 1/cos 45° times that of one used in the prior art.

So that it becomes easy to manufacture the IDT and reflectors, and manufacturing costs can decrease. In addition, a magnitude of an electric field can decrease, so that credibility of the IDT and reflectors can be enhanced.

All the advantages described in the specification are inclusive.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system for measuring pressure and/or temperature of a tire, comprising:
   a board;
   an antenna provided to the board in order to send/receive a micro-wave to/from an external device;
   an inter-digital transducer provided to the board and transducing the micro-wave into a surface acoustic wave;
   a waveguide part forming at least one looped channel of a polygonal shape on the board, the polygonal shape comprising a corner located at the inter-digital transducer; and
   a plurality of reflectors provided to the at least one looped channel at corners different from the corner located at the inter-digital transducer.

2. The system of claim 1, wherein the waveguide part is formed of material for absorbing the surface acoustic wave.

3. The system of claim 2, wherein:
   the at least one looped channel comprises a first looped channel comprising a corner located at the inter-digital transducer; and
   a second looped channel comprising a corner located at the inter-digital transducer,
   wherein the first looped channel and the second looped channel are respectively located at a left side and a right side of the inter-digital transducer.

4. The system of claim 3, further comprising:
   a pressure sensor provided to any one of the first and the second looped channels.

5. The system of claim 4, wherein the pressure sensor is connected to at least one of the plurality of reflectors.

6. The system of claim 3, wherein the first looped channel and the second looped channel have different lengths from each other.

7. The system of claim 3, wherein the first looped channel and the second looped channel are symmetrically located with respect to the inter-digital transducer.

8. The system of claim 1, wherein:
   the at least one looped channel is formed of a rectangular shape; and
   the plurality of reflectors are tilted at 45° with respect to a side of the looped channel.

9. The system of claim 3, wherein the pressure sensor is connected to a reflector positioned to a diagonal direction of the inter-digital transducer.

10. The system of claim 3, wherein:
    the at least one looped channel is formed of a rectangular shape;
    the plurality of reflectors are tilted by 45° with respect to a side of the looped channel; and
    the pressure sensor is connected to a reflector positioned to a diagonal direction of the inter-digital transducer.

11. A system for measuring pressure and/or temperature of a tire, comprising:
    a board;
    an antenna provided to the board in order to send/receive a micro-wave to/from an external device;
    an inter-digital transducer provided to the board and transducing the micro-wave into a surface acoustic wave;
    a waveguide part forming at least one looped channel of a polygonal shape on the board, the polygonal shape comprising a corner located at the inter-digital transducer, wherein the waveguide part comprises a material for absorbing the surface acoustic wave, whereby the surface acoustic wave remains substantially within the looped channel; and a plurality of reflectors provided to the at least one looped channel at corners different from the corner located at the inter-digital transducer.

* * * * *